July 12, 1932.  F. D. KENDRICK  1,867,411
SWIVEL LAMP FOR MOTOR VEHICLES
Filed April 7, 1930
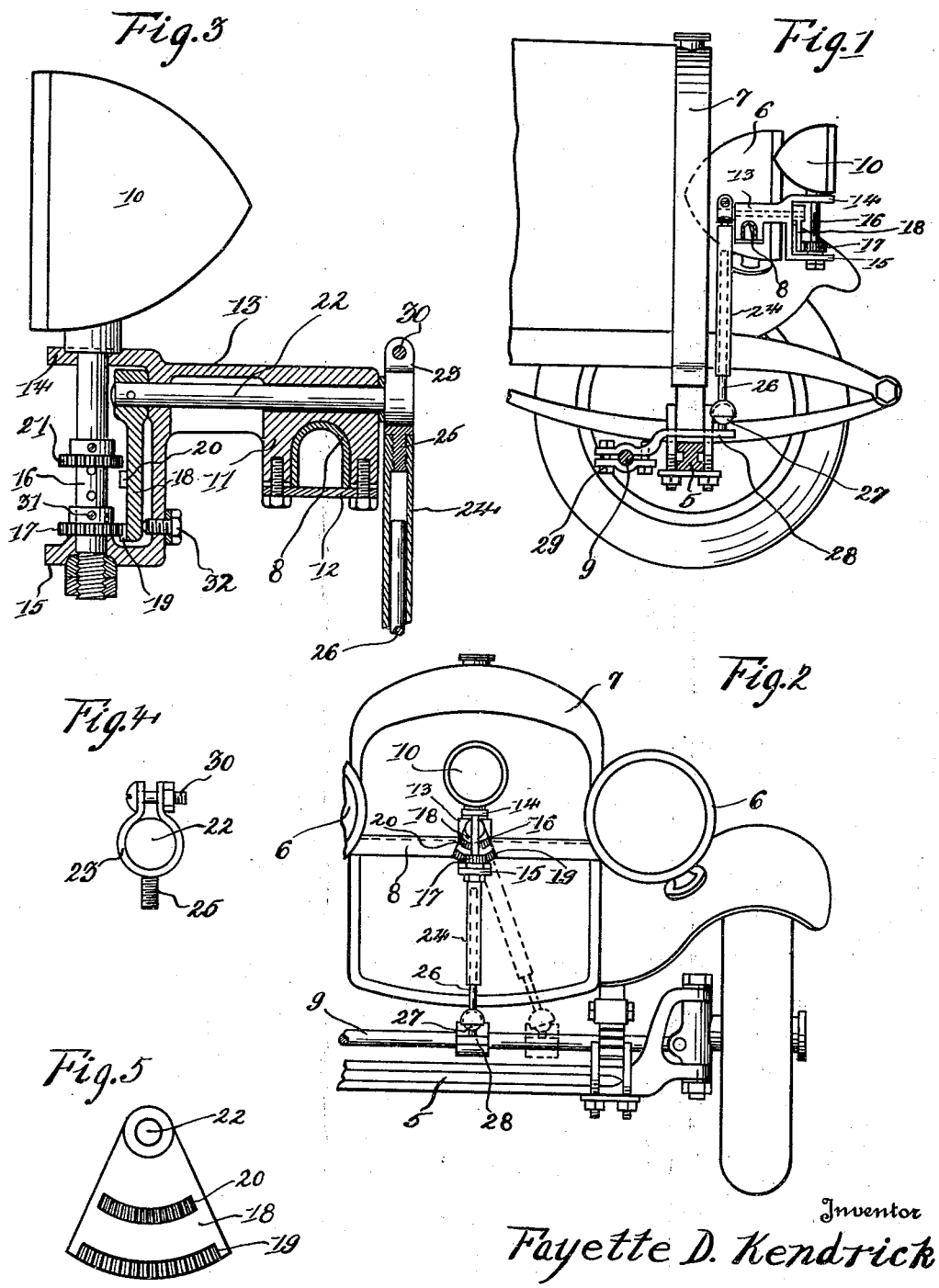
Inventor
Fayette D. Kendrick
By Stryker & Stryker
Attorneys Patented July 12, 1932

1,867,411

UNITED STATES PATENT OFFICE

FAYETTE D. KENDRICK, OF ST. PAUL, MINNESOTA

SWIVEL LAMP FOR MOTOR VEHICLES

Application filed April 7, 1930. Serial No. 442,286.

It is my object to provide simplified and efficient means for automatically turning a headlight for illuminating the road in advance of the vehicle at curves.

Devices of this general character have heretofore been provided but as far as I am aware all of such earlier devices have been relatively complicated and expensive, having many parts which are apt to get out of order and cause objectionable vibration and noisy operation.

The invention will be best understood by reference to the accompanying drawing in which Figure 1 is a side elevation of the device in place on a motor vehicle of common type; Fig. 2 is a front elevation of the same, together with a fragmentary portion of the vehicle; Fig. 3 is a central vertical section through the upper portion of the device; Fig. 4 is a detail, rear view showing the connection between the vertical rod and horizontal shaft and Fig. 5 is a detail, front view of the gear segment.

Referring to Figs. 1 and 2, the device is shown on a vehicle having a front axle 5, stationary lamps 6, a radiator 7 and a horizontal brace 8 rigidly connecting the lamps 6 and extending parallel to the front of the radiator 7. The usual steering tie rod 9 extends horizontally near the axle 5 to cause turning movement of the front wheels in unison. As is well known, such steering tie rods are actuated substantially longitudinally from side to side of the vehicle when the wheels are turned.

A swivel lamp 10 is supported on the brace 8 and is actuated by connection with the steering tie rod 9. Clamp members 11 and 12 are formed to fit the brace 8 and to be secured thereto by suitable bolts, as best shown in Fig. 3. Projecting forward from the clamp member 11 is an arm 13 having upper and lower bearing members 14 and 15 to receive a vertical shaft 16. The lamp 10 is fixed on the upper end of the shaft 16 and a gear 17 is also secured to said shaft near its lower end. To actuate the shaft 16 a gear segment 18 is formed with one set of teeth 19 to mesh with the pinion 17 and another set 20 to mesh with pinion 21, the latter being employed when a different angle of turning is desired.

The gear segment 18 is fixed on the front end of a horizontal shaft 22 which is supported in suitable bearings in the clamp member 11 and arm 13. Secured to the rear end of the shaft 22 is a head 23 to make connection with a tubular crank arm 24. This crank arm is threaded to fit a threaded stud 25 projecting from the head 23 and slidably receives a rod 26 having a ball joint 27 connecting it to the front end of a rigid arm 28. Rigidly securing the rear end of the arm 28 to the tie rod 9 is a suitable clamp 29.

The degree or amplitude of the swivelling movement of the lamp 10 may be reduced by placing the pinion 21 in mesh with the teeth 20 of the gear segment 18 and removing the pinion 17 from mesh with the gear teeth 19. Suitable set screws 31 are provided on the gears 17 and 21 to facilitate this adjustment. The thrust of the gear segment 18 tending to separate the teeth from the pinion is made adjustable by means of a screw 32 which extends through the bearing member 15 and engages the back surface of the gear segment.

To mount the device on a vehicle the clamp 21 is secured to the tie rod 9 so that the arm 28 projects beneath the rear end of the shaft 22 and the lamp 10, with its actuating mechanism having bearings in the clamp member 11 and arm 13, is secured to the brace 8. The rod 28 is then inserted in the tubular member 24 and the head 23 slipped over the projecting end of the shaft 22 and secured thereto by the bolt 30.

Adjustment of the lamp 10 to proper position is accomplished quietly and easily. Thus the front wheels of the vehicle are first placed in the normal, straight position, and with the bolt 30 loose, the focus of the lamp 10 is then directed to the front and the bolt 30 is finally tightened to retain the parts in operative relation. When the vehicle wheels are turned, the tie rod 9 is moved laterally, as indicated in Fig. 2, and carries with it the arm 28 and lower end of the rod 26. This oscillates the shaft 22 and causes the gear segment 18 to turn the pinion 19 (or 21) together with the shaft 16 and lamp 10. This swivelling movement of the lamp 10 is proportional to the degree of turning of the steering wheels of the vehicle.

It will be understood that by my arrangement of the rod 26 in telescopic relation to the tubular member 24, I compensate for the spring suspension of the body of the vehicle and resulting relative, vertical movement between the brace 8 and tie rod 9.

Having described my invention what I claim as new and desire to protect by Letters Patent is:—

1. An attachment for a motor vehicle comprising, a vertical shaft, a swivel lamp secured to said shaft, a horizontal shaft, means for securing said shafts to the vehicle, gearing connecting said horizontal and vertical shafts, means for changing the driving ratio between said shafts, a pendant crank on said horizontal shaft and a connection between said crank and a steering element of the vehicle adapted to actuate said crank to turn said lamp when the vehicle is turned.

2. An attachment for a motor vehicle having a laterally movable steering element near its front end comprising, a vertical shaft, a swivel lamp secured to said shaft, a horizontal shaft, means for securing said shafts to the vehicle, a driving connection between said horizontal and vertical shafts, a pendant crank on said horizontal shaft, said crank comprising telescopically disposed members freely movable relative to each other, a rigid, forwardly projecting arm on said steering element and an articulated connection between said crank and arm to impart oscillating movement to said crank and thereby turn said lamp when the vehicle is turned.

3. An attachment for a motor vehicle having a laterally movable steering element connecting the front wheels of a rigid frame member extending parallel to said element, a vertical shaft, means for securing said shaft to said frame member, a swivel lamp secured to said shaft and means for operatively connecting said swivel shaft with said steering element comprising, a forwardly extending, horizontal shaft, a driving connection between said horizontal and vertical shafts, means for changing the driving ratio between said shafts, a pendant crank on said horizontal shaft, said crank having telescopically arranged members freely movable relative to each other and a connection between said crank and steering element adapted to impart oscillating movement to said crank and thereby turn said lamp when said element is moved for steering.

4. An attachment for a motor vehicle having a laterally movable steering element connecting the front wheels and a rigid frame member extending parallel to said element, a vertical shaft, means for securing said shaft to said frame member, a swivel lamp secured to said shaft and means for operatively connecting said swivel shaft with said steering element comprising, a forwardly extending, horizontal shaft, a gear segment fixed in said horizontal shaft, a pinion fixed on said vertical shaft in mesh with said gear segment, a pendant crank on said horizontal shaft, said crank having telescopically arranged members freely movable relative to each other, a rigid, forwardly projecting arm secured to said steering element and a ball joint connection between said crank and arm.

In testimony whereof, I have hereunto signed my name to this specification.

FAYETTE D. KENDRICK.